June 1, 1937.  J. W. OSTEN  2,082,214
SEAT COVER DISPLAY STAND
Filed Oct. 28, 1935  2 Sheets-Sheet 2
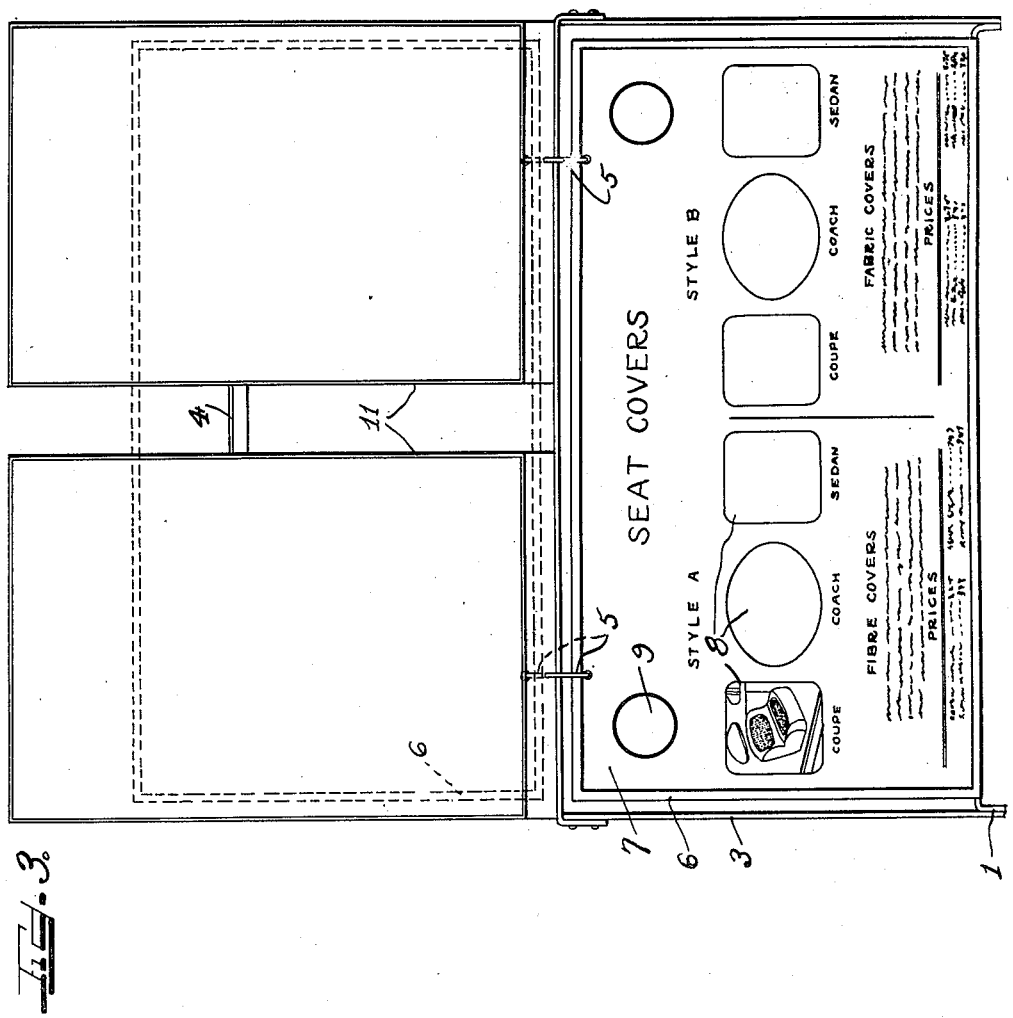
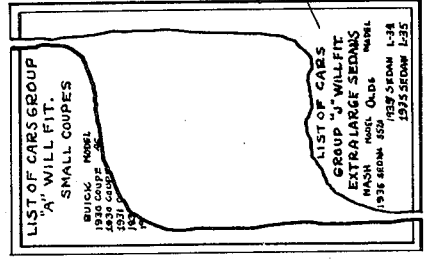
Inventor
Joseph W. Osten.

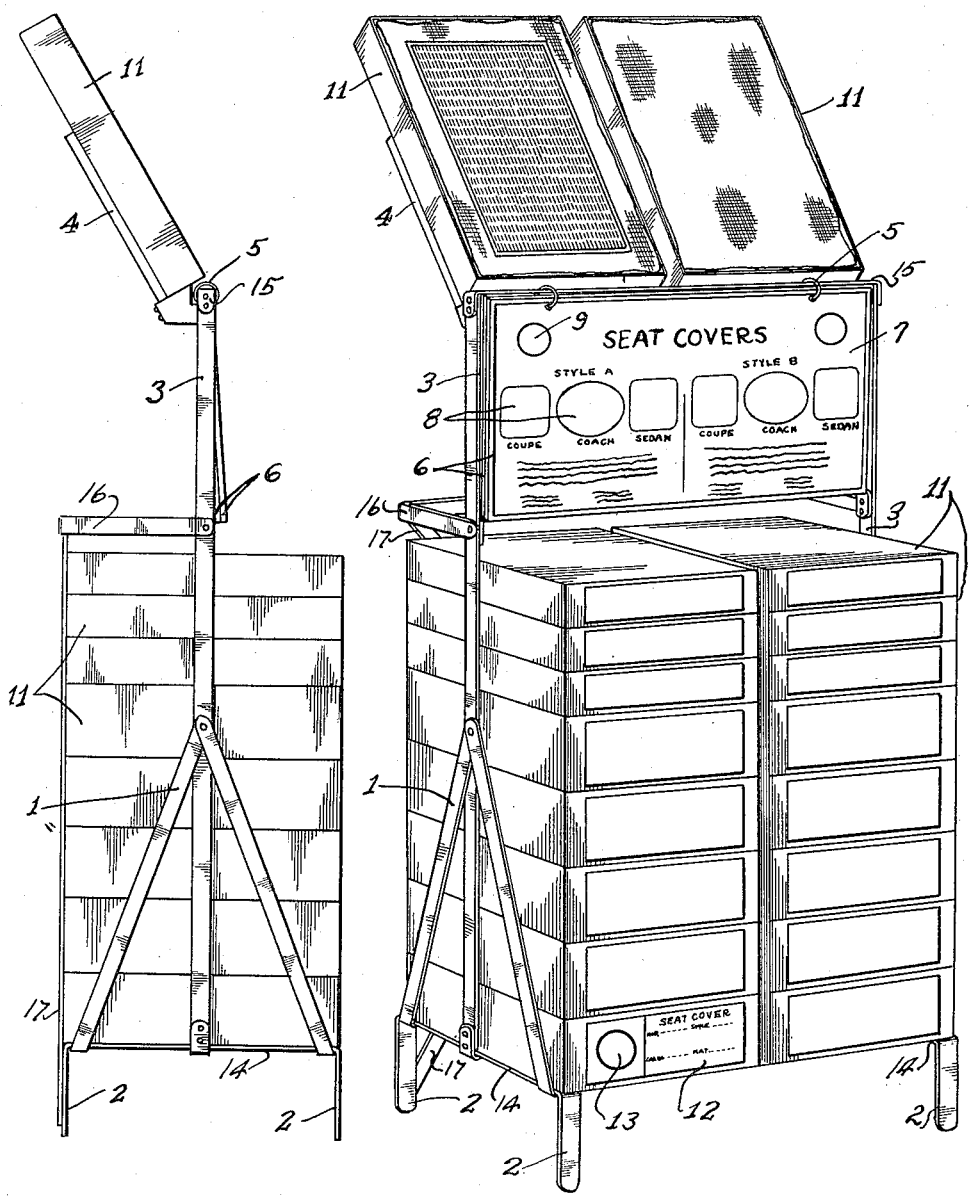

Patented June 1, 1937

2,082,214

UNITED STATES PATENT OFFICE 2,082,214

SEAT COVER DISPLAY STAND

Joseph W. Osten, Chicago, Ill.

Application October 28, 1935, Serial No. 47,009

3 Claims. (Cl. 211—71)

Heretofore in the equipping of automobiles and the like with seat covers for the protection of the cushions and backs of the seats as well as other parts of the upholstering, considerable difficulty and confusion has been encountered in getting the proper styles and sizes of covers to fit the cushions and backs of different makes of automobiles, and different styles and models of the various cars in general use. The confusion has arisen in that there has been no definite method devised for the proper selection of seat covers for a particular style and model of an automobile. It has been found necessary in the past to break up several sets of seat covers selecting the cushion covers from one set and the back covers from another in order to outfit a particular car, with the result that a number of broken sets of seat covers have been left on the dealer's hands making it necessary for the dealer to try to combine the left over seat covers or stand a loss.

This invention relates to an improved vehicle seat cover display stand and supply rack and the method of using the same whereby a service station attendant or the owner of a vehicle with the aid of the year, style, and model of a car, may readily and positively select the correct style and size of seat covers which will exactly fit the seats of the car in question.

It is an object of this invention to provide a seat cover display stand and supply rack having associated therewith information charts for positively selecting the proper style and size of seat covers for a specified make of automobile of a particular year and model.

It is also an object of this invention to provide an improved method of selecting and dispensing seat covers for a selected automobile by consulting a display chart to pick out the style and price of seat covers desired, and then consulting the rear side of the chart covering a list of cars and their proper seat cover sizes permitting the proper seat cover sizes to be selected for the car of a particular make, year, style, and model found under a designated seat cover group, and then finding the desired seat covers in a box, provided with a proper label corresponding with the seat cover chart, and found in a supply rack forming part of the display stand.

It is an important object of this invention to provide a seat cover display stand including a supply rack for supporting seat covers in boxes with the boxes provided with designating labels corresponding with information given on a seat cover size chart and a seat cover style and price chart mounted on swinging panels above the supply rack and beneath a display rack on which the various styles and the seat cover fabrics are disclosed to assist a purchaser in the selection of seat covers for his particular make of automobile.

Other and further important objects of this invention will be apparent from the disclosures in the specification and the accompanying drawings.

The invention (in a preferred form) is illustrated in the drawings and hereinafter more fully described.

On the drawings:

Figure 1 is a perspective view of the seat cover display stand embodying the principles of this invention.

Figure 2 is a side elevation of the display stand.

Figure 3 is an enlarged front elevation of the upper portion of the display stand illustrating the front face of the foremost information chart and furthermore indicating in dotted line the position of the chart when the same is swung upwardly in order to read the seat cover size chart on the back of the chart panel.

Figure 4 is a fragmentary view of the back of the information panel and illustrating fragmentary portions of the seat cover size chart.

As shown on the drawings:

The improved display stand as illustrated in Figures 1 and 2 comprises a bar metal supply rack designated as a whole by the reference numeral 1 and provided with supporting legs 2 extending downwardly from flat metal base members 14 which are connected together by flat metal members (not shown) to form a base. Extending upwardly from the sides of the supply rack 1 is a pair of upright metal frame members 3 having rigidly supported on the upper rear portion thereof an inclined display rack or shelf 4. Pivotally or swingingly mounted on an upper cross bar 15 of the frame members 3 by means of rings 5 or the like are a plurality of chart carrying boards or panels 6 which hang in a convenient position above the supply rack to permit reading of charts mounted on the panels.

Mounted on the front side of the foremost panel 6 is a seat cover style and price chart 7. The chart 7 gives the necessary information for the protection of the upholstering by means of seat covers completely covering the cushions and backs. The chart 7 covers various styles of seat covers and under each style illustrations of the seat covers for various models of automobiles such as coupés, coaches and sedans are shown in picture representations 8 below which a description of the seat cover styles is given as well as the corresponding price lists. Spaces 9 are reserved in the upper corners of the display chart 7 for the reception of the name of a dealer or oil company selling the seat covers.

Mounted on the back of the front panel 6, in an inverted position, is an information chart 10 covering the list of various standard automobiles and their proper seat cover sizes. To read the chart 10, the first panel 6 is swung upwardly into the dotted line position illustrated in Figure 3 to rest upon the display rack or shelf 4 or upon open seat cover boxes or cartons as hereinafter described. The chart 10 covers various lists of cars that various groups of seat covers will fit. Under each group the cars are listed according to their year, style and car model so that a prospective purchaser of seat covers merely has to consult the chart 10 finding the name of the car, the style, the year and then the particular car model, then consulting the heading above the car listing to ascertain the proper seat cover sizes and the group letter or number of the same.

After the group letter has been found from the chart 10, the dealer or the prospective purchaser has merely to refer to the supply rack 1 which contains a number of boxes or cartons 11 each containing a complete set of seat covers. Each of the boxes or cartons 11 has a label 12 pasted on the front end thereof and indicating the model, style, catalog number, and the material of the seat covers contained within the carton. Also provided on the label 12 is an area or space 13 for the dealer's name or for advertising matter if desired.

As clearly illustrated in Figures 1 and 2, the two or more different styles of seat covers are displayed by opening up a plurality of the cartons 11 and placing the same on the display rack 4 so that a prospective purchaser may select the particular style and material which he may desire for his car.

In case a particular style of seat cover is not found in the supply rack 1, the seat covers may be readily obtained from a large or reserve stock of the seat covers.

The additional chart panels 6 are provided to cover a more extensive list of the various automobiles for which seat covers of the proper sizes may be conveniently selected without confusion with the assurance that the selected seat covers will correctly fit the cushions and backs of the automobile seats if the chart has been correctly consulted.

It will thus be seen that the use of the combination supply rack, display rack and the information chart panels containing the information charts affords an arrangement whereby a convenient and improved method is furnished for the proper selection of automobile seat covers without breaking up various sets or combinations as in the past, thereby eliminating the loss of time and confusion in the selection of the proper sizes of covers, and the elimination of losses which heretofore have been encountered with the hit and miss selection of covers in use in the past. As shown in Figures 1 and 2, the pair of upright frame members are connected together by a U-shaped member 16, and a pair of diagonally extending members 17 connect the member 16 with the legs 2 to form an open back for the stand.

It will of course be understood that various details of construction may be varied through a wide range without departing from the principles of this invention, and it is therefore not the purpose to limit the patent granted hereon otherwise than necessitated by the scope of the appended claims.

I claim as my invention:

1. A stand providing three sides and a base for storing merchandise, said stand comprising a base, a pair of transversely spaced members secured to and extending upwardly from said base, a cross-bar connecting the upper ends of said pair of members, inclined members connecting said base and said pair of members, a substantially U-shaped member connected to said pair of members and extending rearwardly therefrom, and other inclined members connecting said U-shaped member to said base.

2. A stand providing three sides and a base for storing merchandise, said stand comprising a base including a pair of inverted U-shaped members, a pair of transversely spaced and vertically extending members secured to said base, a crossbar connecting the upper ends of said pair of vertically extending members, a substantially U-shaped member connected to said pair of vertically extending members and extending horizontally therefrom, and inclined members connecting said U-shaped member and said base.

3. In a storage and sample stand, a base, a pair of transversely spaced and upwardly extending members secured to said base, a cross-bar connecting the upper ends of said pair of members, a rack extending upwardly and rearwardly from the upper ends of said members and connected thereto for support thereby, a substantially U-shaped member connected to said pair of upwardly extending members and extending rearwardly therefrom, and inclined members connecting said U-shaped member to said base.

JOSEPH W. OSTEN.